(12) United States Patent
James-Roxby et al.

(10) Patent No.: US 8,479,042 B1
(45) Date of Patent: Jul. 2, 2013

(54) TRANSACTION-LEVEL LOCKSTEP

(75) Inventors: Philip B. James-Roxby, Longmont, CO (US); Ralph D. Wittig, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 333 days.

(21) Appl. No.: 12/916,904

(22) Filed: Nov. 1, 2010

(51) Int. Cl.
*G06F 11/00* (2006.01)

(52) U.S. Cl.
USPC .............................................. 714/12; 714/11

(58) Field of Classification Search
USPC ......................................................... 714/12
See application file for complete search history.

(56) References Cited

U.S. PATENT DOCUMENTS

| | | | | |
|---|---|---|---|---|
| 6,295,573 | B1 * | 9/2001 | Bailey et al. | 710/260 |
| 6,473,869 | B2 * | 10/2002 | Bissett et al. | 714/12 |
| 2002/0052664 | A1 * | 5/2002 | Kang et al. | 700/94 |
| 2005/0223178 | A1 * | 10/2005 | Garcia et al. | 711/150 |
| 2005/0240810 | A1 * | 10/2005 | Safford et al. | 714/10 |
| 2005/0240811 | A1 * | 10/2005 | Safford et al. | 714/11 |
| 2005/0278460 | A1 * | 12/2005 | Shin et al. | 710/1 |
| 2006/0150000 | A1 * | 7/2006 | Mizutani | 714/6 |
| 2006/0212677 | A1 * | 9/2006 | Fossum | 712/1 |
| 2006/0248322 | A1 * | 11/2006 | Southgate et al. | 712/244 |
| 2007/0174746 | A1 * | 7/2007 | Haefliger et al. | 714/721 |
| 2008/0086729 | A1 * | 4/2008 | Kondoh et al. | 718/1 |
| 2008/0180450 | A1 * | 7/2008 | Dowling | 345/503 |
| 2008/0294882 | A1 * | 11/2008 | Jayapala et al. | 712/241 |
| 2009/0044058 | A1 * | 2/2009 | Choate et al. | 714/40 |
| 2009/0292847 | A1 * | 11/2009 | Henry et al. | 710/261 |
| 2010/0325371 | A1 * | 12/2010 | Jagadish et al. | 711/150 |

OTHER PUBLICATIONS

Ng, Harn Hua, PPC405 Lockstep System on ML310, XAPP564 (v1.0.2) Jan. 29, 2007, pp. 1-13, Virtex-II Pro Family, Xilinx, Inc., 2100 Logic Drive, San Jose, CA 95124.

Nass, Rich, "Xilinx puts ARM Core into its FPGAs", EE Times, 2 pp., Apr. 27, 2010, available at http://www.eetimes.com/electronics-products/processors/4115523/Xilinx-puts-ARM-core-into-its-FPGA.

Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.

U.S. Appl. No. 12/969,355, filed Dec. 15, 2010, Philip B. James-Roxby.

\* cited by examiner

*Primary Examiner* — Chae Ko
(74) *Attorney, Agent, or Firm* — W. Eric Webostad (57) ABSTRACT

An embodiment of a method for a high-assurance operation is disclosed. For this embodiment of the method, a first processor and a second processor are clocked for lockstep operation. A first physical address and a first transaction request are provided to a shared bus from the first processor. A second physical address and a second transaction request are provided to the shared bus from the second processor. The first physical address, the first transaction request, the second physical address, and the second transaction request are passed to a proxy device coupled to the shared bus. The first processor and the second processor are proxy served by the proxy device including generation of a third transaction request and a third physical address by the proxy device.

20 Claims, 9 Drawing Sheets

TRANSACTION-LEVEL LOCKSTEP

FIELD OF THE INVENTION

An embodiment of invention relates to integrated circuit devices ("ICs"). More particularly, an embodiment of the invention relates to transaction-level lockstep for an IC.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Lockstep operation is sometimes used in high-assurance applications. In a "true" or "pure" lockstep system, two processors, such as two microprocessors of different chips or two processor cores of a same microprocessor chip for example, execute identical programs, and the outputs of such processors are checked on a cycle-by-cycle basis by special-purpose hardware, which conventionally may be a separate or an embedded Application Specific Integrated Circuit ("ASIC") chip/block.

Accordingly, it would be desirable and useful to provide a device that avoids costs associated with such ASIC chip/block.

SUMMARY

One or more embodiments generally relate to transaction-level lockstep for an IC.

An embodiment relates generally to a method for a high-assurance operation. In such an embodiment, a first processor and a second processor are clocked for lockstep operation. A first physical address and a first transaction request are provided to a shared bus from the first processor. A second physical address and a second transaction request are provided to the shared bus from the second processor. The first physical address, the first transaction request, the second physical address, and the second transaction request are passed to a proxy device coupled to the shared bus. The first processor and the second processor are proxy served by the proxy device including generation of a third transaction request and a third physical address by the proxy device.

Another embodiment relates generally to a system for high-assurance operation. In such an embodiment, a first processor and a second processor are coupled to a shared bus. The first processor and the second processor are each coupled to receive a same clock signal. A proxy device is coupled to the shared bus to receive physical addresses and transaction requests from the first processor and the second processor. The proxy device configured to: compare address information from the first processor and the second processor; compare transaction information from the first processor and the second processor; and generate a proxy physical address and a proxy transaction request responsive to the address information and the transaction information being for a transaction-level lockstep operation.

Yet another embodiment relates generally to a method for proxy servicing. In such an embodiment, programmable resources are programmed to provide a proxy device. A first processor and a second processor are clocked with a same clock signal. A first physical address and a first instruction are provided from the first processor to a first interface of the proxy device. A second physical address and a second instruction are provided from the second processor to a second interface of the proxy device. For a transaction-level lockstep operation, the first physical address and the second physical address are determined by the proxy device to be for a same memory location associated with a memory device or a memory mapped peripheral device, and the first instruction and the second instruction are determined by the proxy device to be for a same action. For the proxy servicing, a third instruction is generated by the proxy device as a substitute for the first instruction and the second instruction, and a third physical address is generated by the proxy device as a substitute for the first physical address and the second physical address.

BRIEF DESCRIPTION OF THE DRAWINGS

Accompanying drawings show exemplary embodiments in accordance with one or more aspects of the invention; however, the accompanying drawings should not be taken to limit the invention to the embodiments shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
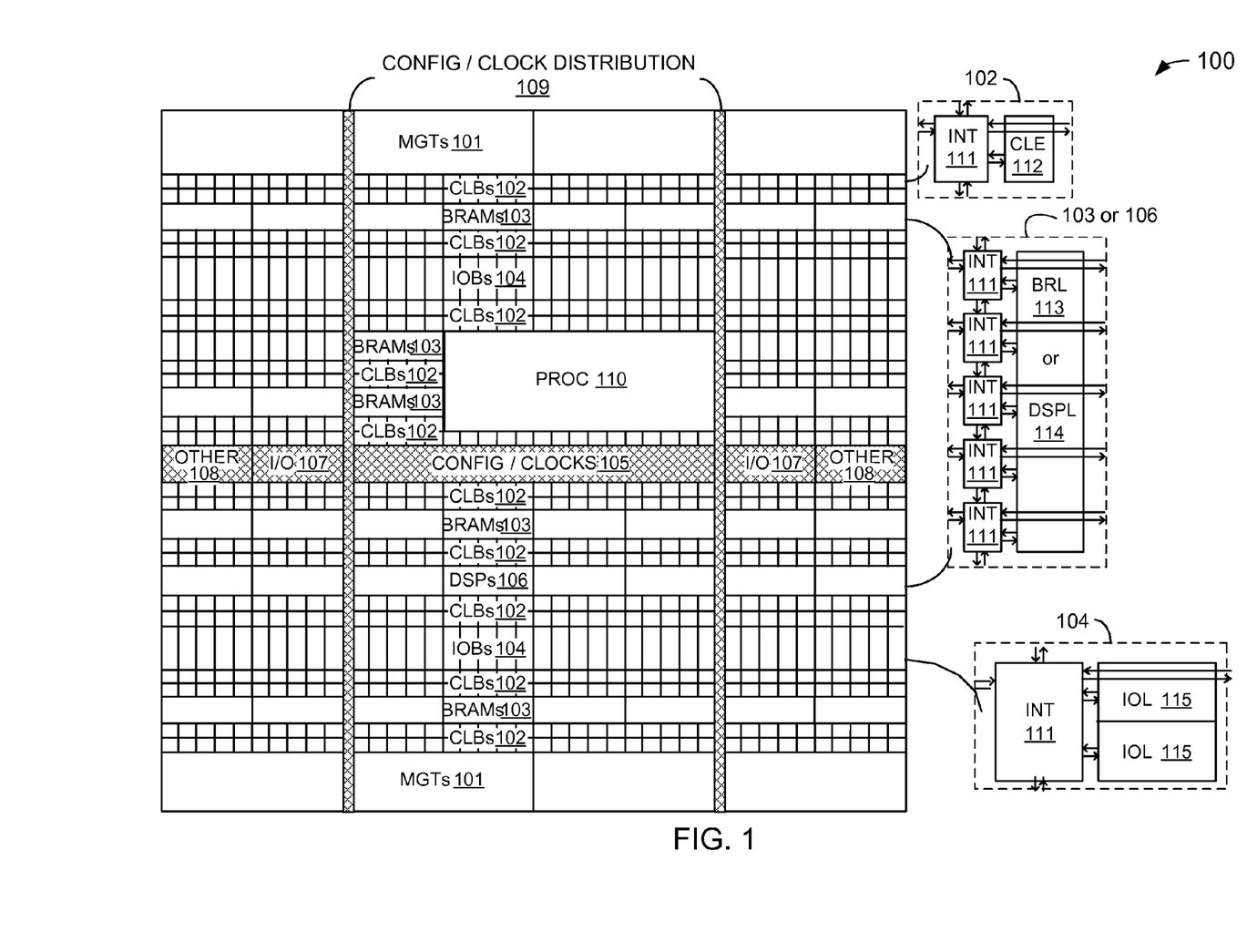
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Again, lockstep operation is sometimes used in high-assurance applications. In a "true" or "pure" lockstep system, two processors, such as two microprocessors of different chips or two processor cores of a same microprocessor chip for example, execute identical programs, and the outputs of such processors are checked on a cycle-by-cycle basis by special-purpose hardware, which conventionally may be a separate or an embedded ASIC chip/block.

If outputs from the processors match for a cycle, such special-purpose hardware allows a transaction to proceed, where conventionally one of two identical transactions is allowed to proceed. If, however, outputs from such processors do not match on a cycle, this indicates that an error has occurred. If an error is detected, a transaction is not allowed to proceed, namely it is blocked. In some implementations, an error may cause initiation of a system-wide lock.

The addition of a conventional special-purpose hardware ASIC block for operating multiple processors on a cycle-by-cycle basis as previously described for "true" lockstep operation adds a significant amount of cost. However, such costly overhead may not be required in applications where the assurance level or the security level is not as strict.

For example some lockstep applications, have two general-purpose processors execute identical programs with outputs of such processors being checked using software waypoints. Thus, flags in the software may be used to check that both processors are at the same waypoint in execution before a transaction is allowed to proceed past such a waypoint. However, software waypointing may not provide a sufficient level of assurance or security for some applications, as there is too loose of a connection to cycle-to-cycle verification.

Described below are embodiments of a system, as well as operations thereof, that is not as costly as a system having such a conventional special-purpose hardware ASIC block but that has a level of assurance or security higher than software waypointing.

Figure 2:
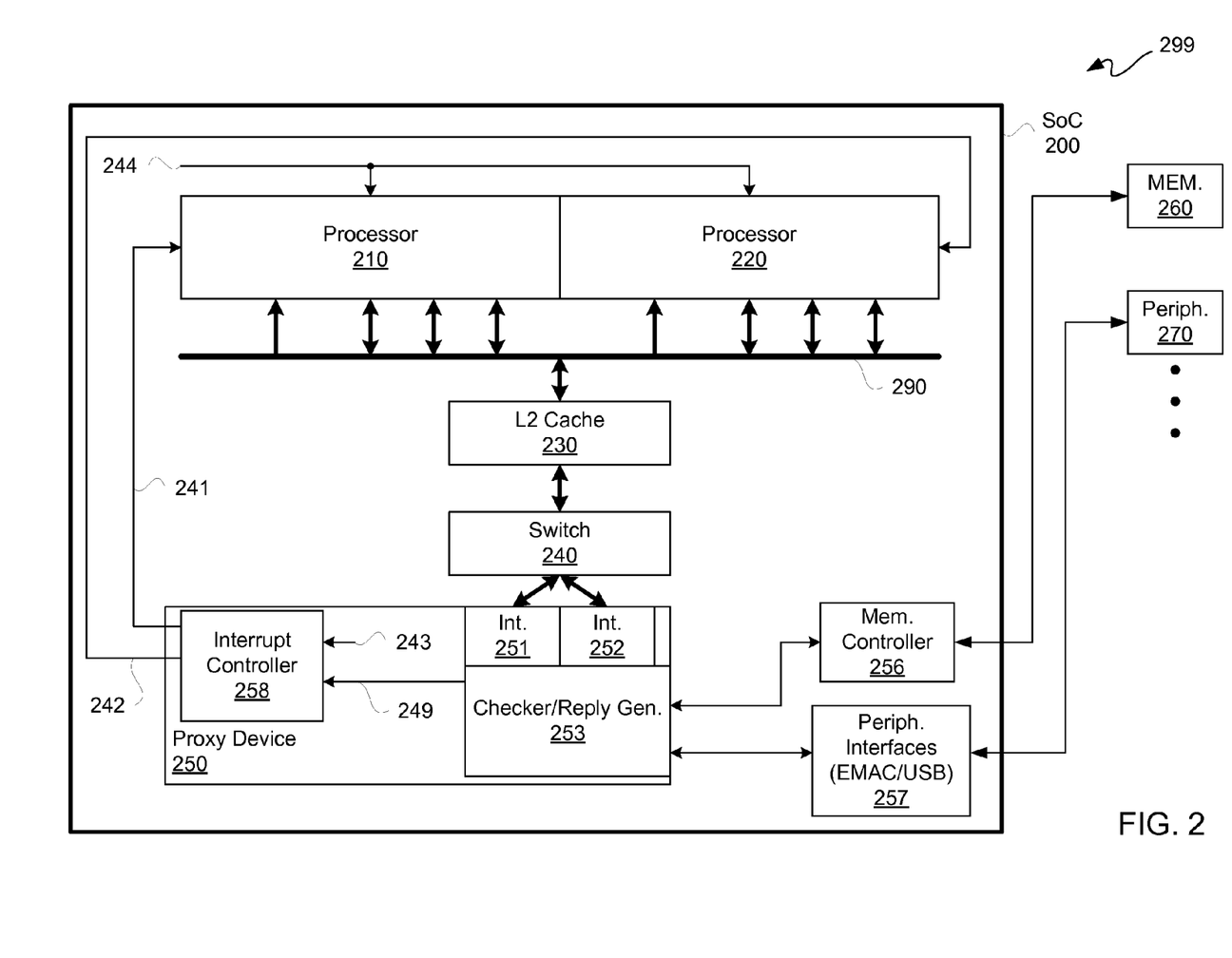
FIG. 2 is a block diagram depicting an exemplary embodiment of a high-assurance and/or high-security system having a System-on-Chip ("SoC").

FIG. 2 is a block diagram depicting an exemplary embodiment of a high-assurance and/or high-security system 299. More particularly, system 299 includes a system-on-chip ("SoC") 200 coupled to external memory 260 and one or more external peripheral devices 270. Peripheral devices 270 may be memory mapped peripheral devices. SoC 200 may be implemented using a host integrated circuit, such as FPGA 100 of FIG. 1. However, it should be understood that any integrated circuit, such as a multi-core microprocessor, a microcontroller, or an I/O hub for example, may be used for providing SoC 200.

SoC 200 includes at least two processors, namely processor 210 and processor 220, and a shared bus 290. Processors 210 and 220, which generally are the same, are coupled to a shared bus 290. Shared bus 290 may be a local processor bus. Processors 210 and 220 may be "hard blocks" of SoC 200. Processors 210 and 220 may be ARM®, IBM® PowerPC™, Intel®, or other embedded processors. In other applications, processors 210 and 220 may be instantiated in programmable resources, such as MicroBlaze™ processors available from Xilinx Incorporated of San Jose, Calif. However, for purposes of clarity by way of example and not limitation, it shall be assumed that processors 210 and 220 are hard blocks having general-purpose processor cores, namely SoC is a multi-core IC.

Processors 210 and 220 are both coupled to receive a clock signal 244. Thus, processors 210 and 220 may be clocked responsive to clock signal 244 for lockstep operation. SoC 200 further includes a level two ("L2") cache 230, a switch 240, programmable resources 250, a memory controller 256, and one or more peripheral interfaces 257. It should be understood that L2 cache 230 and shared bus 290 may be part of the architecture associated with processors 210 and 220.

Instantiated in programmable resources 250 is a proxy device, hereinafter namely proxy device 250. More particularly, for this exemplary embodiment, proxy device 250 may be formed using programmable resources, including without limitation, CLBs or other programmable resources. For SoC 200 being hosted in an FPGA IC, such as for example a Xilinx® FPGA, such programmable resources may form part of the programmable "fabric" of such host device. However, it should be understood that any IC having programmable resources suitable for the following description may be used. Along those lines, it should be understood that rather than an ASIC block, programmable resources may be used to provide a proxy device 250 instead of special-purpose hardware.

Additionally, for this exemplary embodiment, proxy device 250 is coupled to shared bus 290 through L2 cache 230 and switch 240. However, in other embodiments, proxy device 250 may be implemented with a combination of programmable and dedicated resources. Furthermore, in other embodiments, L2 cache 230 may not be used, namely in other embodiments a more direct interface to programmable resources may be used. However, for purposes of clarity by way of example and not limitation, it shall be assumed that processors 210 and 220, as well as L2 cache 230 and shared bus 290, are for an ARM® Dual Cortex™-A9MPCore with an AMBA®-AXI Interface.

Proxy device 250 includes a checker/reply generator 253, a first interface 251, a second interface 252, and an interrupt controller 258. Interfaces 251 and 252 may be secondary interfaces in comparison to primary interfaces of processors 210 and 220, as described below in additional detail. Coupled to interfaces 251 and 252 is a checker/reply generator 253.

Interrupt controller 258 may be clocked responsive to a clock signal 243 such that a same interrupt may be provided both on interrupt path 241 and interrupt path 242 from interrupt controller 258 on a same clock cycle of clock signal 243. Interrupt path 241 is directly connected to processor 210 for providing interrupts thereto, and interrupt path 242 is directly coupled to processor 220 for providing interrupts thereto.

A same program executing on processors 210 and 220 handles interrupts, such as from a peripheral of peripherals 270, in the same way. In some implementations of multi-processor systems, including without limitation multi-core systems, interrupts from shared peripherals may only be sent to one processor. However, by having point-to-point interrupt support from interrupt controller 258 to processors 210 and 220 respectively via interrupt paths 241 and 242, each such processor may be interrupted from a shared peripheral.

During a transaction-level lockstep mode, processors 210 and 220 may have normal interrupt handling disabled and accept interrupts from interrupt controller 258 of proxy device 250. In such an embodiment, an interrupt may be passed from a shared peripheral of peripherals 270 to a reply generator portion of checker/reply generator 253. Such reply generator portion would thus identify a "reply" as an interrupt for passing to interrupt controller 258 via interrupt path 249 of proxy device 250. Such interrupt may then be passed from interrupt controller 258 on a same clock cycle of clock signal 243 onto interrupt paths 241 and 242 for interrupting of processors 210 and 220 at generally the same time. By passing an interrupt in a same clock cycle to processors 210 and 220 along independent and dedicated interrupt paths 241 and 242, each such processor is able to handle the interrupt in the same manner and at generally the same time. Such interrupt may thereafter be processed in processors 210 and 220 simultaneously.

By allowing access to processor shared peripherals, where such peripherals may produce interrupts to processors, each program executing on processors 210 and 220 may handle interrupts in the same way and generally at the same time as described herein. By supporting a multi-core processor architecture with point-to-point interrupt provisioning, namely from proxy device 250 to each of processors 210 and 220 via direct or point-to-point interrupt paths 241 and 242, respectively, multiple processor cores may share access to a same peripheral, such as a memory mapped external peripheral device 270, at a same time as described herein. In other words, each of processors 210 and 220 may be interrupted from a shared peripheral at generally a same time as described herein.

Checker/reply generator 253 may be coupled to memory controller 256. Memory controller 256, which may be a hard block, may be coupled to external memory 260. Thus, checker/reply generator 253 may perform reads and writes to external memory 260 via memory controller 256.

Checker/reply generator 253 is further coupled to one or more peripheral interfaces 257 for coupling to one or more external peripheral devices 270. In this particular exemplary embodiment, a hard block Ethernet Media Access Controller ("EMAC") and a hard block Universal Serial Bus ("USB") interface are illustratively depicted for peripheral interfaces 257. However, it should be understood that one or more of these and/or other types of peripheral interfaces may be used.

It should be understood that even though processors 210 and 220 are clocked for lockstep operation responsive to clock signal 244, such lockstep operation is not a pure lockstep operation, as previously described. More particularly, a special-purpose ASIC block for lockstep operation is not included SoC 200 for processors 210 and 220. Rather, processors 210 and 220 are general-purpose processors. Thus, a form of lockstep operation, which is referred to herein as "transaction-level" lockstep operation, is provided without having to use a special-purpose ASIC block for lockstep operation.

This ability to do transaction-level lockstep operation is provided with use of proxy device 250. Proxy device 250 is implemented using programmable resources. It should further be understood that transaction-level lockstep operation, as described herein, is generally for applications that do not require as high a level of security or assurance as true lockstep operation. However, such transaction-level lockstep operation may be used instead of or in addition to software waypointing, as well as may be used for applications involving more stringent assurance or security than software waypointing.

As described below in additional detail, transactions and physical addresses may be communicated from processors 210 and 220 to shared bus 290 for L2 cache 230. Such instructions and associated physical addresses may be flagged as non-cacheable. Accordingly, L2 cache 230 may be effectively disabled from caching such instructions and physical addresses such that L2 cache 230 essentially operates in a pass-through mode. Transactions and physical addresses output from L2 cache 230 are provided to switch 240, which may be implemented with dedicated circuitry. Depending upon physical address, switch 240 directs a transaction and its associated physical address to either interface 251 or 252 of proxy device 250.

Figure 3:
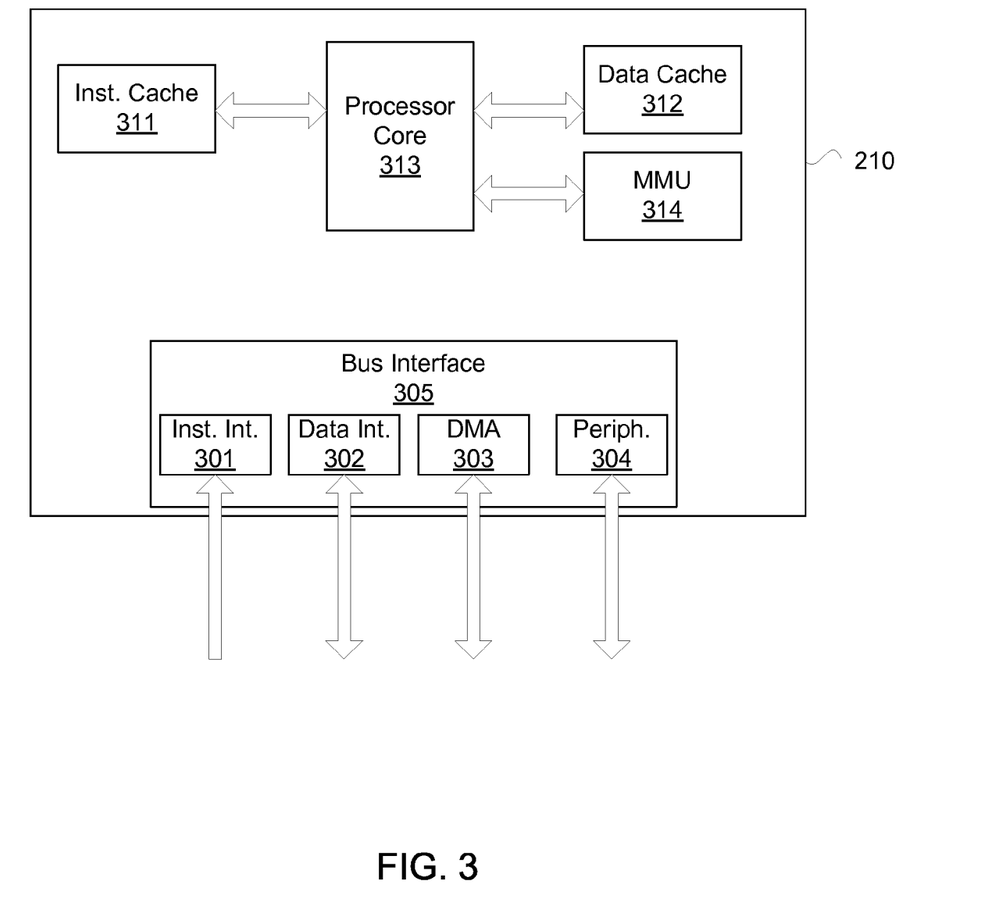
FIG. 3 is a block diagram depicting an exemplary embodiment of processor.

FIG. 3 is a block diagram depicting an exemplary embodiment of processor 210. Processors 210 and 220 may have the same block diagram, and thus only processor 210 is described in additional detail with reference to FIG. 3 for purposes of clarity and not limitation.

Processor 210 in this exemplary embodiment includes an instruction cache 311, a processor core 313, a data cache 312, a memory management unit ("MMU") 314, and a bus interface or bus matrix 305. Bus interface 305 may include an instruction interface 301, a data interface 302, a direct memory address ("DMA") interface 303, and a peripheral port or interface 304, all of which are coupled to shared bus 290 of FIG. 2.

Processor core 313 is coupled to instruction cache 311, data cache 312, and MMU 314, and one or more of these block are coupled to bus interface 305 through not illustratively depicted. It should be understood that not all interconnections of processor 210 are illustratively depicted for purposes of clarity and not limitation, as processor 210 may be any conventional general-purpose processor.

Figure 4:
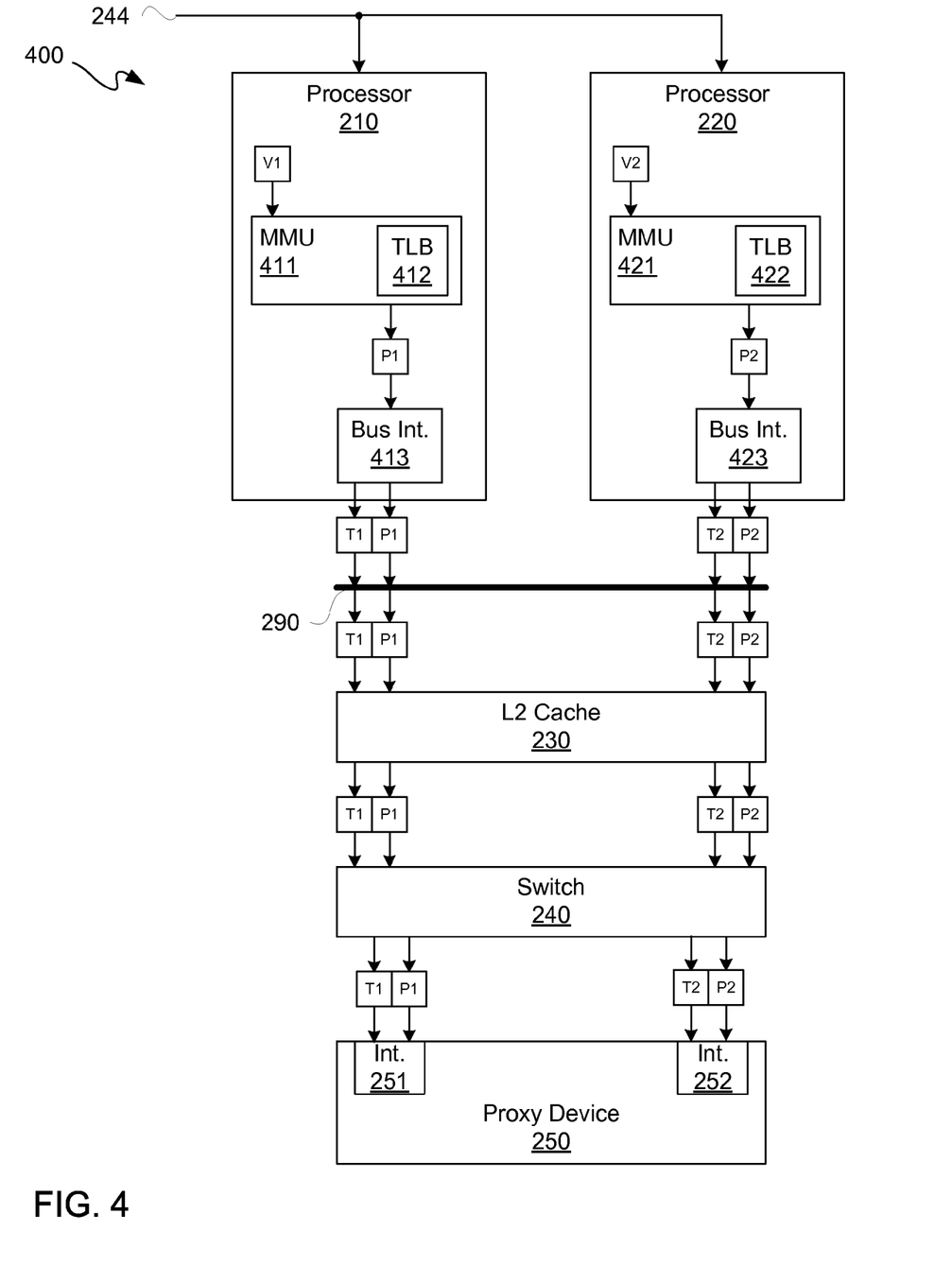
FIG. 4 is a block/flow diagram depicting an exemplary embodiment of an address/transaction flow.

FIG. 4 is a block/flow diagram depicting an exemplary embodiment of an address/transaction flow 400. FIG. 4 is further described with additional reference to FIGS. 2 and 3.

Processors 210 and 220 receive clock pulses from clock signal 244. Responsive to such clocking and to program instructions, the latter of which may be provided to processors 210 and 220 via shared bus 290 or other busing not shown for purposes of clarity, processor 210 and 220 may generate or initiate respective virtual addresses, such as illustratively depicted virtual addresses V1 and V2 for example. It should be understood that processors 210 and 220 execute instructions such as may be obtained from software, firmware, microcode, or the like. Accordingly, additional detail regarding providing instructions, as well as data, to processors 210 and 220, as well as processor internal execution and/or processing thereof, is omitted for purposes of clarity and not limitation.

Virtual address V1 and V2 may be provided to MMU 411 and MMU 421 respectively of processors 210 and 220 for translation. It should be understood that MMUs 411 and 421 may be the same as MMU 314. MMUs 411 and 421 may have access to or include an associated translation look-aside buffer ("TLB") for translating virtual addresses into physical addresses. In this exemplary embodiment, MMU 411 includes TLB 412, and MMU 421 includes TLB 422.

For this example, MMU 411 using TLB 412 translates virtual address V1 into physical address P1, and likewise MMU 421 using TLB 422 translates virtual address V2 into physical address P2. Processor 210 and 220 may use a one-to-one mapping for virtual-to-physical address translation in TLBs 412 and 422, respectively. However, TLBs 412 and 422 may be configured to point to different physical address ranges for such virtual address. More particularly, TLBs 412 and 422 may be set up to point to non-overlapping address ranges. Such address ranges may be for example to cover an area of memory, including without limitation external memory and memory mapped peripheral devices. More particularly, such area covered by such address ranges may be set aside for processor-to/from-programmable resources communication, such as for example communication between programmable fabric, such as in which proxy device 250 is instantiated, and processors 210 and 220.

By way of example and not limitation, TLB 412 may be set up to point to addresses only in address range 0x8000_0000 to 0x8fff_ffff, and TLB 422 may be set up to point to addresses only in address range 0x9000_0000 to 0x9fff_ffff. These non-overlapping address ranges cover an area of memory of 256 megabytes in size. These address ranges never overlap because of one hexadecimal position toward a MSB end of such addresses always being either an 8 or a 9. Of course, these or other address ranges may be used as may vary from application to application.

Still within processor 210, physical address P1 may be provided to a bus interface 413 for shared bus 290, and still within processor 220, physical address P2 may be provided to a bus interface 423 for shared bus 290. Bus interfaces 413 and 423 may be the same as bus interface 305. Additionally, it should be understood that in association with such physical addresses P1 and P2 there may be transaction or instruction requests, such as illustratively depicted as T1 and T2 in this example. In this example, a transaction request T1 is provided along with physical address P1 from processor 210 to shared bus 290, and a transaction request T2 is provided along with physical address P2 from processor 210 to shared bus 290.

It should be understood that even though processors 210 and 220 are clocked with a same clock signal 244, such processors 210 and 220 may not operate in perfect lockstep synchronization. Thus, transaction requests and physical addresses from processors 210 and 220 may arrive at shared bus 290 at same or different times, including without limitation same or different clock cycles of clock signal 244. For example, transaction request T1 and physical address P1 may be provided to shared bus 290 before transaction request T2 and physical address P2. More particularly, for example, transaction request T1 and physical address P1 may be provided from processor 210 to shared bus 290 during a same or different clock cycle of clock signal 244 than transaction request T2 and physical address P2 are provided to shared bus 290 from processor 220.

Thus, it should be understood that even though processors 210 and 220 are clocked for lockstep operation responsive to clock signal 244, such lockstep operation is not a pure lockstep operation, as transactions T1 and T2 are allowed to go onto shared bus 290 from processors 210 and 220 on different clock cycles of clock signal 244.

It should be understood that transaction T1 and T2, as well as associated physical addresses P1 and P2, respectively, provided to shared bus 290 are precluded from being passed outside of SoC 200 until verification, as described below in additional detail. Again, this is not a cycle-by-cycle lockstep operation out of processors 210 and 220; however, transaction-level lockstep operation does provide finer grained control than software waypoints. Because programmable resources may be used to implement proxy device 250, no special hard blocks need be implemented for providing proxy device 250. Rather, SoC 200 may be a commercially available IC configured with a proxy device 250 for transaction-level lockstep operation as described herein.

Again, it should be understood that the exemplary embodiment described herein as going through L2 cache 230 may not be used in other embodiments to communicate with proxy device 250. However, for an exemplary embodiment where processors 210 and 220 are ARM processors, L2 cache 230 may be used as described herein in additional detail. Even though an embodiment using ARM processors is described herein for purposes of clarity by way of example and not limitation, it should be understood that the particular implementation described should not limit the scope of the disclosure herein, as it will be apparent that many variations to such implementation may be used as may vary from application-to-application.

In addition to setting up address ranges for TLBs 412 and 422, TLBs 412 and 422 may be configured to identify whether a transaction is cacheable or not. For an ARM processor, a cacheable attribute is defined either as inner cacheable/outer non-cacheable or not cacheable at all. In this exemplary embodiment, L2 cache 230 is effectively in a pass-through mode when in a transaction-level lockstep mode by having TLBs 412 and 422 identify physical addresses, such as addresses P1 and P2, as being non-cacheable. Again, even though an embodiment for ARM processors for processors 210 and 220 is described and thus cacheable/non-cacheable notation therefor, it should be understood that other cacheable/non-cacheable notations may be used.

With continuing reference to FIG. 4, pair T1 and P1 and pair T2 and P2 are passed respectively from processors 210 and 220 to shared bus 290, and from shared bus 290 such pairs are passed through L2 cache 230 to switch 240. Switch 240 is configured to key on a value of a physical address as to which of interfaces 251 and 252 to pass a transaction and physical address pair. An address range set up for TLB 412 may be for addresses pointing to interface 251, and an address range set up for TLB 422 may be for addresses pointing to interface 252.

Accordingly, virtual address space visible by processor 210 is transformed to a physical address space mapped to interface 251 of proxy device 250. Likewise, virtual address space visible by processor 220 is transformed to a physical address space mapped to interface 252 of proxy device 250. Thus, for example, if processor 210 requests a read from memory for example using a virtual address 0x0000_0000, such virtual address may be transformed by MMU 411 using TLB 412 to a physical address 0x8000_0000 for interface 251 of proxy device 250. Moreover, processor 220, which in a transaction-level lockstep mode will be running the same program as processor 210, will likewise request a read from memory at virtual address 0x0000_0000, and such virtual address may be transformed by MMU 421 using TLB 422 to a physical address 0x9000_0000 for interface 252 of proxy device 250. Even though these examples of virtual and physical addresses are used for purposes of clarity, it should be understood that these or other virtual and physical addresses may be used.

Continuing the above example, pair T1 and P1 is passed from switch 240 to interface 251 responsive to an 8 in an interface identifier (hexadecimal) position of physical address P1, and pair T2 and P2 is passed from switch 240 to interface 252 responsive to a 9 in an interface identifier (hexadecimal) position of physical address P2. Thus, switch 240 is configured to switch-pass transactions and associated physical addresses to either of interfaces 251 and 252 of proxy device 250 responsive to values in interface identifier positions of such physical addresses. In the above example, a single bit difference between 8 and 9 hexadecimal values may be used to differentiate between interfaces 251 and 252. However, other values, value positions, or bits to differentiate may be used as may vary from application-to-application. Proxy device 250, which is instantiated in programmable resources, may be configured to check each incoming transaction and physical address provided to interfaces 251 and 252, as described below in additional detail.

Figure 5:
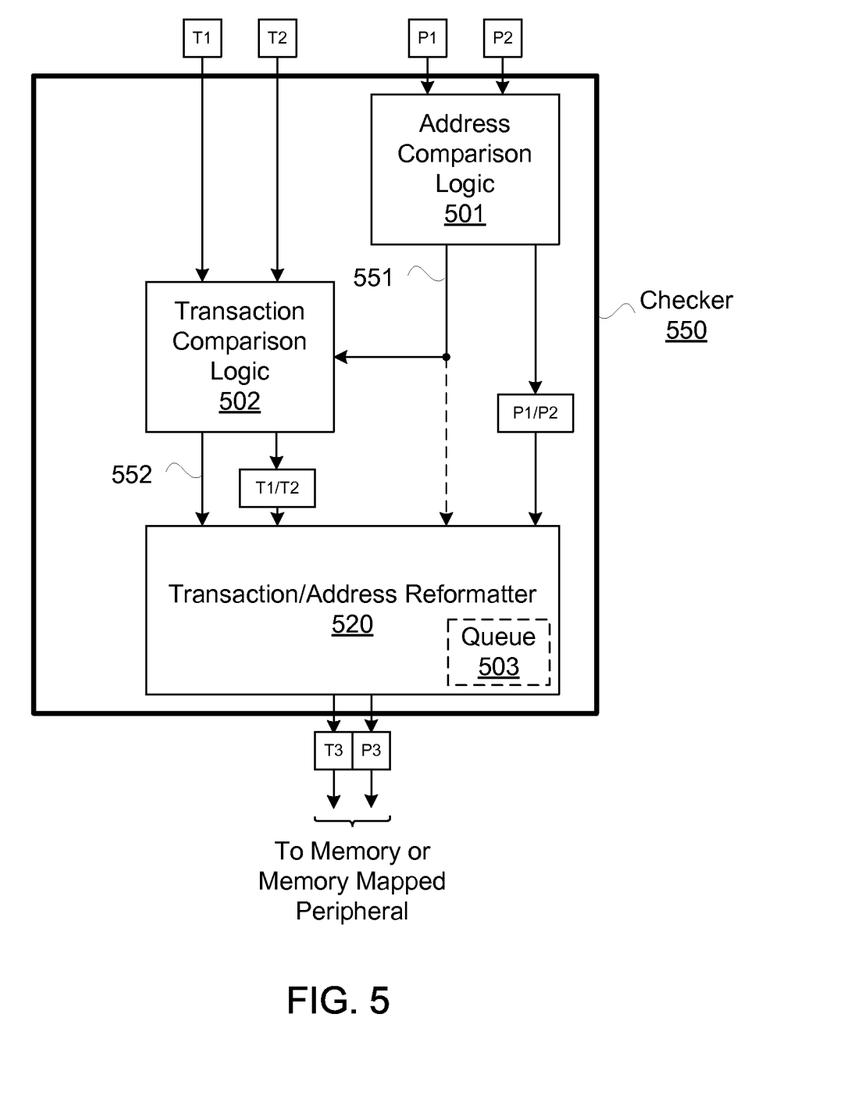
FIG. 5 is a block diagram depicting an exemplary embodiment of a checker.

FIG. 5 is a block diagram depicting an exemplary embodiment of a checker 550. Checker 550 may be a portion of checker/reply generator 253 of proxy device 250 of FIG. 2. Checker 550 includes address comparison logic 501, transaction comparison logic 502, and transaction/address reformatter 520. With simultaneous reference to FIGS. 2 through 5, the above example of FIG. 4 is further described with additional reference to checker 550.

Checker 550 receives pair T1 and P1 from interface 251 and receives pair T2 and P2 from interface 252. Physical address P1 and P2 are provided to address comparison logic 501. If physical addresses P1 and P2 are for a same target memory location, then activation signal 551 is asserted for transaction comparison logic 502 as an output of address comparison logic 501. Furthermore, either physical address P1 or P2 is passed from address comparison logic 501 to transaction/address reformatter 502 provided, however, that physical address P1 and P2 are for a same location in external memory 260 or a same address for a memory mapped external peripheral device 270. For purposes of clarity by way of example and not limitation, it shall be assumed that physical address P1 and P2 are for a same location in external memory 260.

It should be understood that physical address P1 and P2 are not the same, as they are from non-overlapping address ranges, as previously described. Thus, address comparison logic 501 may be configured to determine that physical address P1 and P2 are for a same location even though they may differ from one another in other respects. In short, address comparison logic 501 may be configured to determine that physical address P1 and P2 are for a same or different location apart from any difference associated with addressing interfaces 251 and 252.

While address comparison logic 501 is comparing physical addresses P1 and P2, transaction comparison logic 502, which receives transaction request T1 and T2 may compare those transactions to one another. For example, transaction comparison logic 502 may be configured to interrogate received transactions. An interrogation may be to determine whether processor 210 requested transaction T1 appearing on interface 521 and determine whether processor 220 requested transaction T2 appearing on interface 252. Additionally, it may be determined whether metadata about transaction requests T1 and T2 are identical. For example, metadata may include transaction length, width, and security setting. Furthermore, if transaction requests T1 and T2 are for a write, then comparison as to whether the data accompanying transaction requests T1 and T2 is identical may be determined. One or more of these or other determinations may be used for interrogating transaction requests.

If, and only if, transaction requests T1 and T2 match one another, then comparison logic 502 passes either transaction request T1 or T2 to transaction/address reformatter 520, along with a signal indicating that transaction requests T1 and T2 are valid, namely activation signal 552. Activation signal 552 from transaction comparison logic 502 is provided to transaction/address reformatter 520 along with transaction information, such as from either of transaction requests T1 and T2 as output from transaction comparison logic 502. Optionally, activation signal 551 from address comparison logic 501 may be provided to transaction/address reformatter 520. Such option may be in addition to being provided to transaction comparison logic 502 or being provided to transaction/address reformatter 520 instead of transaction comparison logic 502.

Address/transaction reformatter 520, which obtains transaction information from either transaction T1 or T2 and address information from either physical address P1 or P2, forms a new transaction request and a new physical address, namely transaction request T3 and physical address P3. Transaction request T3 and physical address P3 are proxies for the received transaction requests T1 and T2 and physical addresses P1 and P2, and such transaction request T3 and physical address P3 may be provided memory device or a memory map peripheral device. Thus, proxy device 250 proxy serves processors 210 and 220, as memory device or a memory map peripheral device receiving T3 and P3 would effectively see such transaction request as originating from such proxy device 250, namely not originating from processors 210 and 220 which in effect actually originated such transaction request.

It should be understood that sending two transaction requests to a same address may cause a problem such as for a memory map peripheral or may unnecessarily load a memory interface. Accordingly, by having a single proxy transaction request provided rather than two transaction requests, such problems or loading may be avoided. Additionally, an acknowledgment of completion or data and/or other information in response to a transaction request T3 is to be provided back to a reply generator, such as a reply generator portion of checker/reply generator 253 of FIG. 2. Accordingly, transaction T3 and physical address P3 do not exactly match either corresponding pair, namely either transaction T1 and physical address P1 or transaction T2 and physical address P2. This change is to ensure that the response or reply to such transaction is initially provided back to proxy device 250.

Optionally, a queue 503 may be included as part of address/transaction reformatter 520 for queuing pairs of transactions T3 and P3 to be processed. Thus, multiple transactions may be processed as opposed to processing one transaction waiting for its completion before processing another transaction. In this manner transactions may be queued and pipelined for processing multiple transactions through system 299 of FIG. 2. Thus, use of optional queue 503 allows a number of transactions to be queued by proxy device 250 for processing transaction requests in turn or sequence. For example, each queued pair of transactions that match, both as to address location and transaction request, may be executed in turn subject to availability of a memory controller or peripheral interface, such as availability of memory controller 256 or a peripheral interface of peripheral interfaces 257. However, for purposes of clarity by way of example and not limitation, it shall be assumed that only a single transaction at a time is allowed to be "in flight" through SoC 200, even though in other embodiments within the scope hereof multiple transactions may be "in flight" at a time. Thus, for purposes of clarity by way of example and not limitation, only processing of transaction requests T1 and T2 and their associated physical addresses is described, even though in other embodiments other sets of transactions may be processed without waiting for completion of transactions T1 and T2.

Furthermore, it should be understood that transaction T3 and physical address P3 do not leave SoC 200 of FIG. 2 until and after it has been verified that transaction requests T1 and T2 match one another and that physical address P1 and P2 are for a same address of a memory device or memory map peripheral device. This may be generally thought of as transaction-level lockstep authentication.

Figure 6:
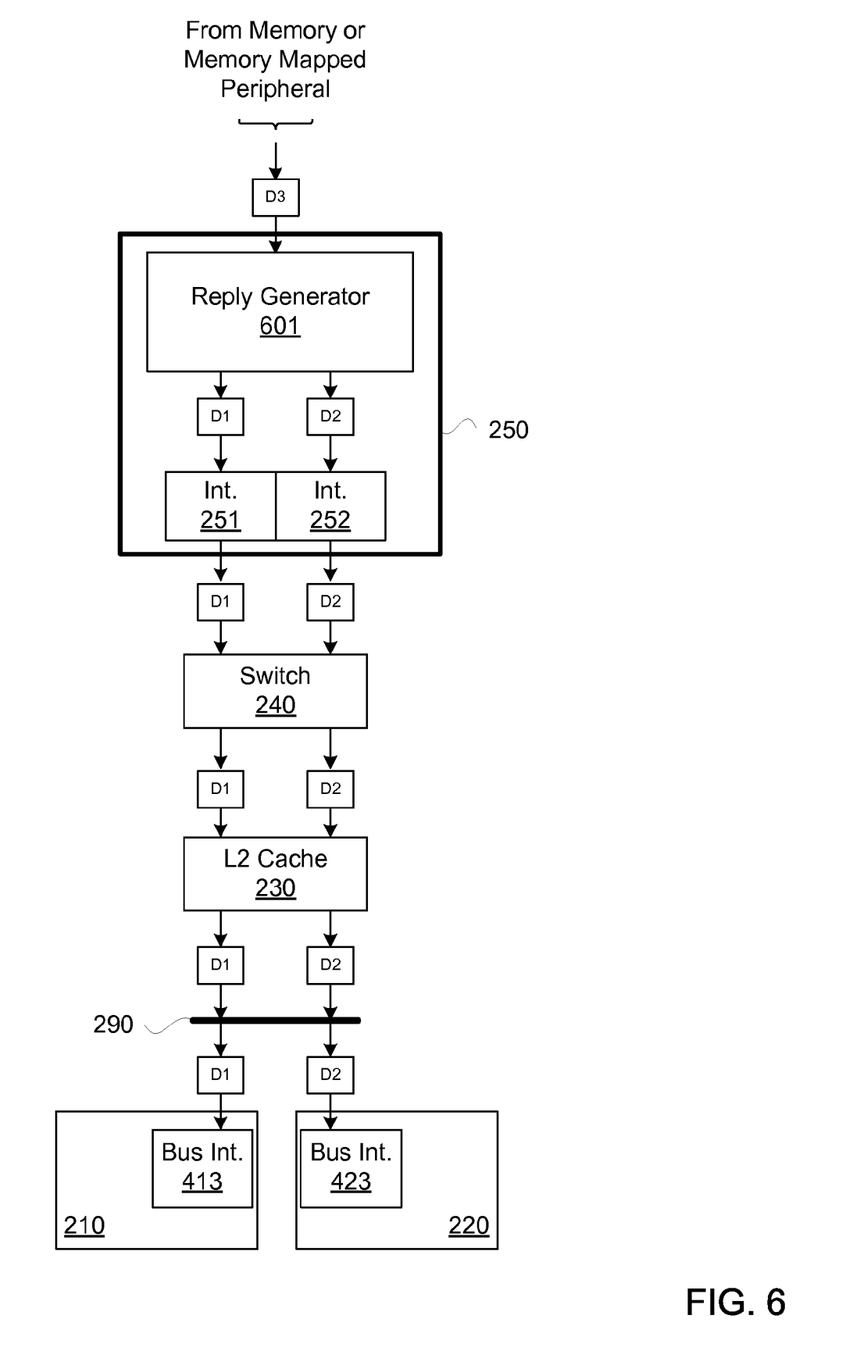
FIG. 6 is a block diagram depicting an exemplary embodiment of a portion of the SoC of FIG. 2.

FIG. 6 is a block diagram depicting an exemplary embodiment of a portion of SoC 200 of FIG. 2. With simultaneous reference to FIGS. 2 through 6, such portion of SoC 200 is further described. For purposes of clarity by way of example and not limitation, it shall be assumed that in response to transaction request T3 and physical address P3 data D3 is obtained, such as from a read operation. Furthermore, even though data D3 may be obtained from a memory device or a memory map peripheral device, it shall be assumed for purposes of clarity and not limitation, that data D3 is obtained from memory device in response to transaction request T3 being a read memory request.

In response to transaction request T3, data D3 is returned to proxy device 250 and more particularly to reply generator 601. Reply generator 601 may be a reply generator portion of checker/reply generator 253 of FIG. 2. Reply generator 601 copies data D3 into two data strings or blocks, namely data D1 and D2. Additionally, reply generator 601 may add other information indicating that data D1 and D2 are respectively in response to transaction request T1 and T2 as respectively associated with physical addresses P1 and P2. Data D1 and D2 may respectively be passed to interfaces 251 and 252 of proxy device 250. Data D1 and D2 may be provided to switch 240 and switch 240 may pass data D1 and D2 to L2 cache 230.

Again, L2 cache 230 is in a pass-through mode for this exemplary embodiment as data D1 and D2 are indicated as non-cacheable by reply generator 601; however, again, in other embodiments L2 cache 230 may be avoided. Data D1 and D2 is passed from L2 cache 230 to shared bus 290, and from shared bus 290, data D1 and D2 are respectively passed to bus interfaces 413 and 423 respectively of processors 210 and 220. More particularly, data may be provided via a data interface 302 of FIG. 3 as associated with each of processors 210 and 220.

Figure 7:
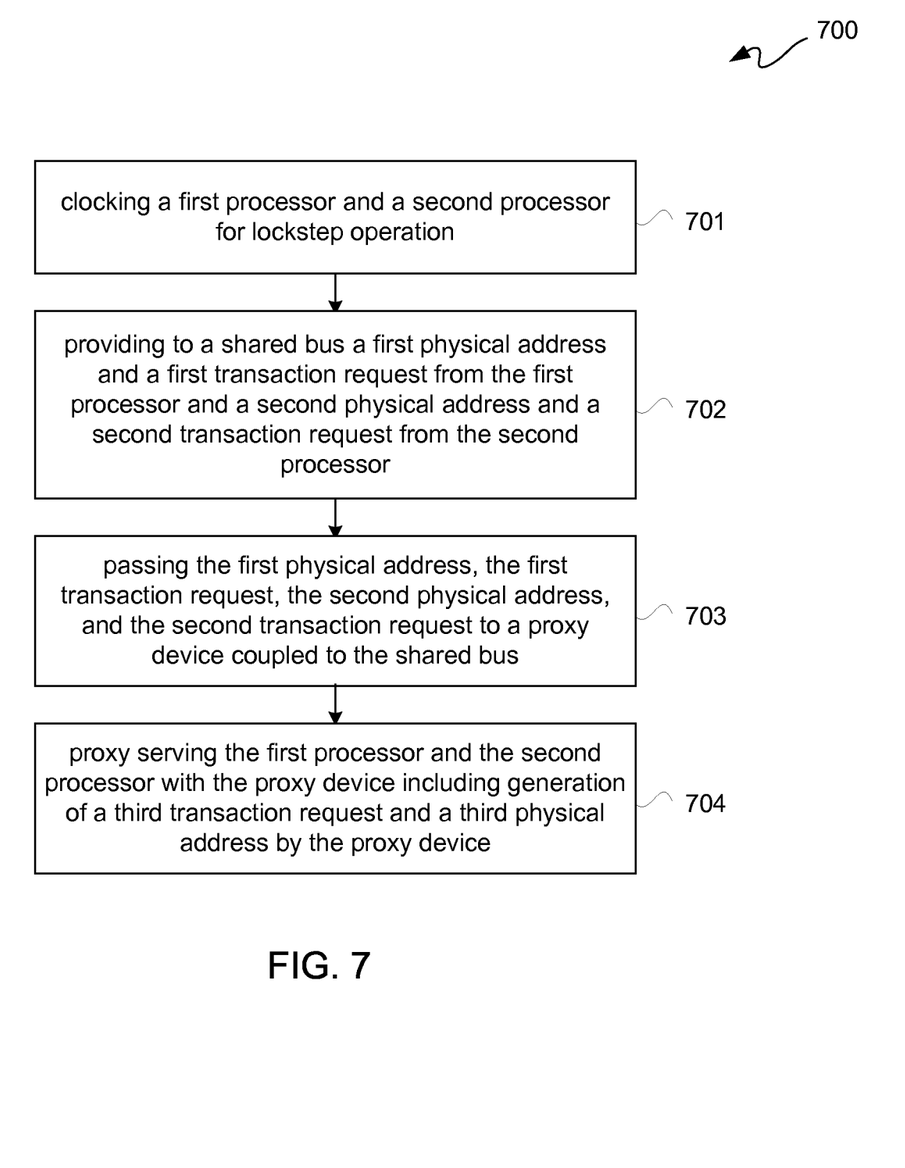
FIG. 7 is a flow diagram depicting an exemplary embodiment of a high-assurance flow.

FIG. 7 is a flow diagram depicting an exemplary embodiment of a high-assurance flow 700. At 701, a first general-purpose processor core ("first processor") and a second general-purpose processor core ("second processor") are clocked with a same clock signal for transaction-level lockstep operation as described herein.

At 702, a first physical address and a first transaction request are provided to a shared bus, where such first physical address and first transaction request are provided from such first processor. Furthermore, at 702, a second physical address and a second transaction request are provided to such a shared bus, where such second physical address and second transaction request are provided from such second processor.

At 703, the first and second physical addresses and transaction requests from operation 702 are passed to a proxy device coupled to such shared bus. At 704, such first and second processors are proxy served by such proxy device, including generation of a third transaction request and a third physical address by such proxy device. Such third transaction request and physical address are generated using information obtained from either the first or second transaction request and either the first or second physical address, respectively. However, as previously described herein, such third transaction request and physical address need not be generated until after verification or authentication of a transaction-level lockstep operation, as previously described for example with reference to having matching locations in physical addresses P1 and P2 and matching transaction requests T1 and T2.

Figure 8:
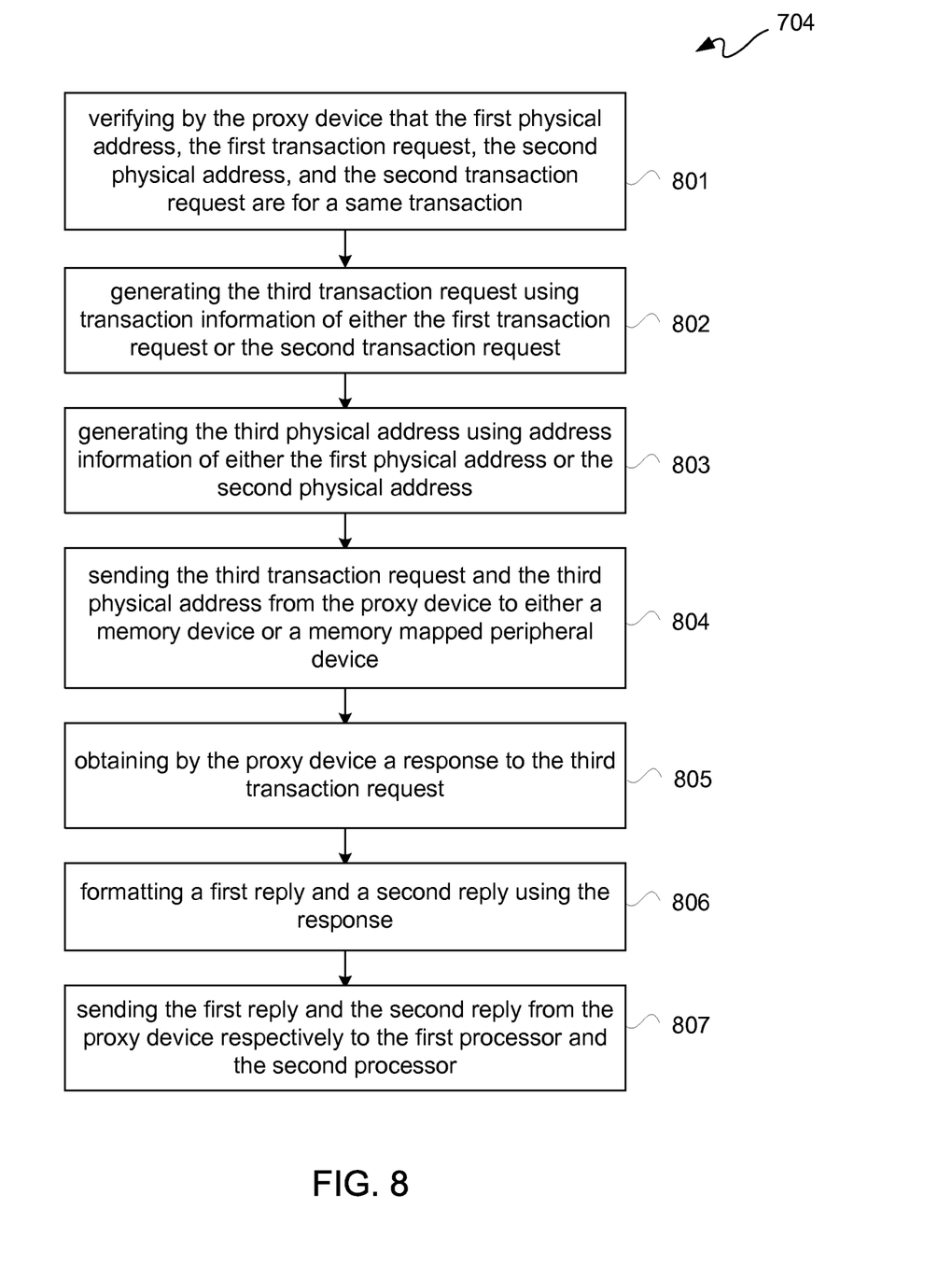
FIG. 8 is a flow diagram depicting an exemplary embodiment of operations for an operation of FIG. 7.

FIG. 8 is a flow diagram depicting an exemplary embodiment of operations for operation 704 of FIG. 7. At 801, a proxy device respectively verifies that a first physical address/transaction request pair and a second physical address/transaction request pair are for a same transaction. For example, as previously described herein, physical addresses P1 and P2 are compared to one another, and transaction requests T1 and T2 are compared to one another.

At 802, a third transaction request is generated using transaction request information of either the first or second transaction request. At 803, a third physical address is generated using physical address information of either the first or second physical address. It should be appreciated that operations at 802 and 803 may be performed in parallel or in reverse sequence.

At 804, such third transaction request and third physical address are sent from a proxy device to a memory controller or peripheral interface for a memory device or a memory mapped peripheral device. At 805, such proxy device may obtain a response to such third transaction request for such third physical address. For purposes of clarity by way of example and not limitation, it is assumed that such third transaction request is processed without interrupt. Furthermore, such response may be an acknowledgement, read data, or other form of transaction request response, or any combination of these.

At 806, a first reply and a second reply are formatted using information obtained from such response obtained at 805. At 807, such first reply and second reply are respectively sent to a first processor and a second processor respectively having sent the first transaction request and the second transaction request.

Figure 9:
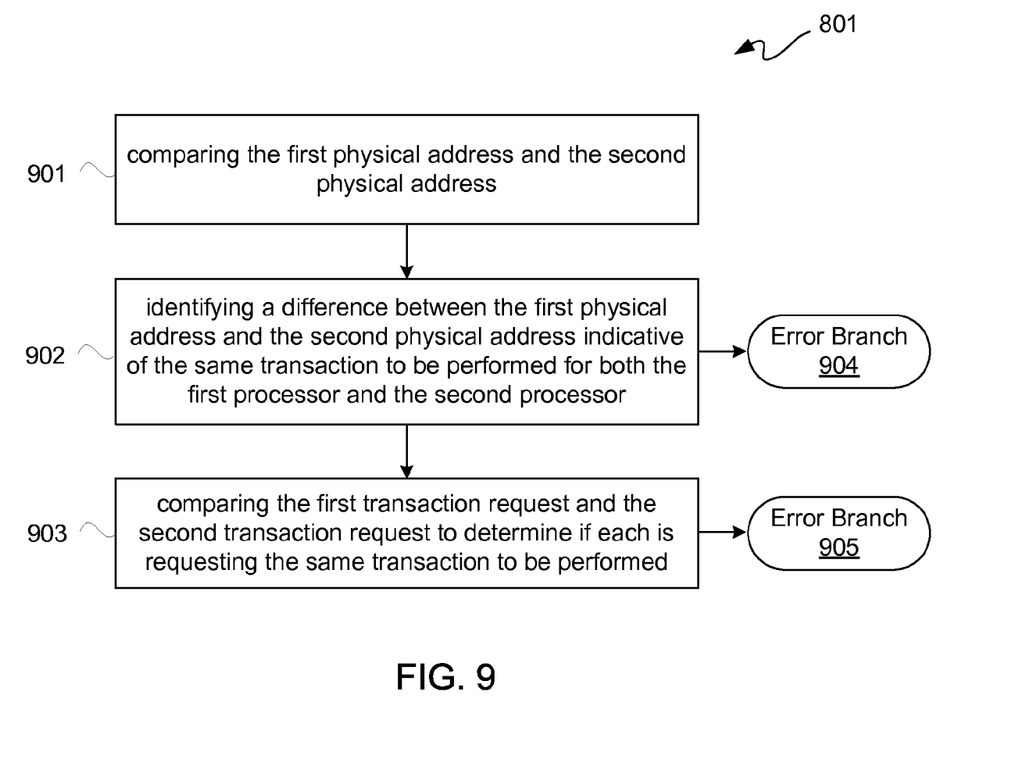
FIG. 9 is a flow diagram depicting an exemplary embodiment of operations for an operation of FIG. 8.

FIG. 9 is a flow diagram depicting an exemplary embodiment of operations for operation 801 of FIG. 8. At 901, a first physical address and a second physical address may be compared.

At 902, a difference between such first physical address and second physical address may be identified, where such difference is only in interface addressing to a proxy device indicating that such first and second physical addresses are for a same location. In other words, such difference may be used as a flag to indicate that such first and second physical addresses are from different interfaces of a proxy device. Again, this may be used to facilitate use of non-overlapping address spaces for addressing a proxy device by separate general-purpose processors.

If, however, at 902 it is determined that such difference is more than just for different interfaces of a proxy device as between first and second physical addresses, namely more of a difference than just a flag, then an error signal may be generated as generally indicated by error branch 904. Examples of differences other than a flag may be different address locations in memory, different memory mapped peripherals, or a combination thereof. Error handling may vary from application-to-application, and thus is not described in unnecessary detail herein for purposes of clarity.

Assuming for purposes of clarity by way of example and not limitation at 902 it is determined that such first and second physical addresses are for a same address location in memory or a memory mapped peripheral device, then at 903 a first transaction request and a second transaction request may be compared. At 903, such first and second transaction request may be compared to determine whether or not they are for a same requested transaction to be performed. It should be appreciated that operations at 902 and 903 may be performed in parallel or reverse order.

However, with renewed reference to FIG. 5, assertion of an activation signal 551 by address comparison logic 501 may be used to trigger a comparison of transaction requests by transaction comparison logic 502. Comparing physical addresses may be simpler and quicker than comparing transaction requests. Accordingly, comparison of physical addresses may be performed to determine whether to compare transactions so as to conserve processing overhead with respect to instances in which physical addresses are not for a same location.

Returning to FIG. 9, if at 903 it is determined that the first and second transaction requests are each requesting the same transaction to be performed, then at 802 and 803 of FIG. 8 the third transaction request and physical address are generated. If, however, at 903 it is determined that the first and second transaction requests are not for a same transaction, then an error signal may be generated as generally indicated by error branch 905, from which error handling may be invoked. Again, error handling may vary from application-to-application, and thus is not described in unnecessary detail herein for purposes of clarity.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. A method for a high-assurance operation, comprising:
   clocking a first processor and a second processor for lockstep operation on a cycle-by-cycle basis;
   providing to a shared bus a first physical address and a first transaction request from the first processor;
   providing to the shared bus a second physical address and a second transaction request from the second processor;
   passing the first physical address, the first transaction request, the second physical address, and the second transaction request to a proxy device coupled to the shared bus; and
   proxy serving the first processor and the second processor by the proxy device including generation of a third transaction request and a third physical address by the proxy device.

2. The method according to claim 1, wherein the proxy serving includes:
   verifying by the proxy device that the first physical address and the first transaction request and the second physical address and the second transaction request are for a same transaction;
   generating the third transaction request using transaction information of either the first transaction request or the second transaction request;
   generating the third physical address using address information of either the first physical address or the second physical address; and sending the third transaction request and the third physical address from the proxy device to either a memory device or a memory mapped peripheral device.

3. The method according to claim 2, wherein the proxy serving further includes:
obtaining by the proxy device a response to the third transaction request;
formatting a first reply and a second reply using the response;
wherein the first reply corresponds to the first transaction request;
wherein the second reply corresponds to the second transaction request; and
sending the first reply and the second reply from the proxy device respectively to the first processor and the second processor.

4. The method according to claim 2, wherein the verifying includes:
comparing the first physical address and the second physical address;
identifying a difference between the first physical address and the second physical address indicative of the same transaction to be performed for both the first processor and the second processor; and
comparing the first transaction request and the second transaction request to determine if each is requesting the same transaction to be performed.

5. The method according to claim 1, further comprising:
initiating a first virtual address by the first processor and a second virtual address by the second processor in lockstep;
first translating the first virtual address by the first processor into the first physical address; and
second translating the second virtual address by the second processor into the second physical address;
wherein the first physical address and the first transaction request are passed to the shared bus on a different clock cycle than the second physical address and the second transaction request.

6. The method according to claim 1, wherein the proxy serving further includes:
obtaining an interrupt from a peripheral device;
clocking an interrupt handler of the proxy device;
providing point-to-point interrupt handling for passing the interrupt directly to each of the first processor and the second processor; and
the point-to-point interrupt handling including clocking an interrupt handler for sending each of the first processor and the second processor the interrupt on a same clock cycle.

7. The method according to claim 6, further comprising disabling normal interrupt handling for each of the first processor and the second processor to allow for the point-to-point interrupt handling.

8. A system for high-assurance operation, comprising:
a first processor and a second processor coupled to a shared bus;
wherein the first processor and the second processor are each coupled to receive a same clock signal;
wherein the first processor and the second processor are clocked for lockstep operation on a cycle-by-cycle basis of the clock signal; and
a proxy device coupled to the shared bus to receive physical addresses and transaction requests from the first processor and the second processor;
wherein the proxy device is configured to:
compare address information from the first processor and the second processor;
compare transaction information from the first processor and the second processor; and
generate a proxy physical address and a proxy transaction request responsive to the address information and the transaction information being for a transaction-level lockstep operation.

9. The system according to claim 8, wherein:
the proxy device is coupled to receive a first physical address and a first transaction request from the first processor and a second physical address and a second transaction request from the second processor;
the proxy device is configured to:
determine if the first physical address and the second physical address are for a same transaction target address;
determine if the first transaction request and the second transaction request are for a same transaction; and
generate a third transaction request as the proxy transaction request and a third physical address as the proxy physical address responsive to:
the first physical address and the second physical address being for the same transaction target address; and
the first transaction request and the second transaction request being for the same transaction.

10. The system according to claim 9, wherein the proxy device is configured to:
generate the third transaction request using the transaction information of either the first transaction request or the second transaction request;
generate the third physical address using the address information of either the first physical address or the second physical address; and
send the third transaction request and the third physical address to either a memory device or a memory mapped peripheral device;
wherein the third transaction request appears to either the memory device or the memory mapped peripheral device as originating from the proxy device.

11. The system according to claim 9, wherein the proxy device includes a checker; and wherein the checker includes:
a first compare circuit for comparing the first physical address and the second physical address to one another; and
a second compare circuit for comparing the first transaction request and the second transaction request to one another.

12. The system according to claim 11, wherein:
the first physical address is translated from a first virtual address;
the second physical address is translated from a second virtual address;
the first physical address is in a first address range;
the second physical address is in a second address range;
the first address range and the second address range do not overlap one another;
the first address range is in an address space for communication between the first processor and a first interface of programmable resources;
the second address range is in the address space for communication between the second processor and a second interface of the programmable resources; and
the proxy device is instantiated in the programmable resources.

13. The system according to claim 8, wherein:
the proxy device is coupled to the shared bus via a level-two cache and a switch;
the transaction requests are configured to be non-cacheable by the level-two cache so as to pass through the level-two cache to the switch; and
the switch is for switching between interfaces.

14. The system according to claim 13, wherein the system is a system-on-chip; and wherein the programmable resources are of a programmable logic device hosting the system-on-chip.

15. The system according to claim 8, wherein:
the proxy device includes an interrupt controller;
the interrupt controller is directly coupled to the first processor and the second processor; and
the proxy device is configured to pass an interrupt from a memory mapped peripheral device to the first processor and the second processor via the interrupt controller.

16. A method for proxy servicing, comprising:
programming programmable resources to provide a proxy device;
clocking a first processor and a second processor with a same clock signal;
wherein the first processor and the second processor are clocked for lockstep operation on a cycle-by-cycle basis of the clock signal;
providing a first physical address and a first instruction from the first processor to a first interface of the proxy device;
providing a second physical address and a second instruction from the second processor to a second interface of the proxy device;
determining by the proxy device for a transaction-level lockstep operation that:
the first physical address and the second physical address are for a same memory location associated with a memory device or a memory mapped peripheral device; and
the first instruction and the second instruction are for a same action; and
generating by the proxy device for the proxy servicing:
a third instruction as a substitute for the first instruction and the second instruction; and
a third physical address as a substitute for the first physical address and the second physical address.

17. The method according to claim 16, further comprising:
translating a first virtual address from a first processor core of the first processor and a second virtual address from a second processor core of the second processor respectively into the first physical address and the second physical address;
wherein the first physical address and the second physical address are in a first address range and a second address range, respectively;
wherein the first address range is within a range of addresses for communication between the programmable resources and the first processor; and
wherein the second address range is within the range of addresses for communication between the programmable resources and the second processor.

18. The method according to claim 16, wherein the determining that the first instruction and the second instruction are for the same action includes comparing meta-data; and wherein the meta-data includes length, width, and security setting of each of the first instruction and the second instruction.

19. The method according to claim 16, wherein generating the third instruction includes adding meta-data from either the first instruction or the second instruction to cause the memory device or the memory mapped peripheral device associated therewith to respond to the proxy device with respect to carrying out the third instruction.

20. The method according to claim 16, further comprising:
obtaining by the proxy device an interrupt from the memory device or the memory mapped peripheral device;
on a same clock cycle, passing the interrupt from the memory device or the memory mapped peripheral device to both the first processor and the second processor from an interrupt controller of the proxy device.

* * * * *